(12) United States Patent
He et al.

(10) Patent No.: US 11,190,377 B1
(45) Date of Patent: Nov. 30, 2021

(54) TIME-FREQUENCY BLOCK-SPARSE CHANNEL ESTIMATION METHOD BASED ON COMPRESSED SENSING

(71) Applicant: WUHAN UNIVERSITY, Hubei (CN)

(72) Inventors: Yigang He, Hubei (CN); Yuan Huang, Hubei (CN); Liulu He, Hubei (CN); Chaolong Zhang, Hubei (CN); Bolun Du, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/161,628

(22) Filed: Jan. 28, 2021

(30) Foreign Application Priority Data

May 26, 2020 (CN) .......................... 202010454893.2

(51) Int. Cl.
*H04L 25/02* (2006.01)
*H04L 5/00* (2006.01)
*H04B 7/0413* (2017.01)

(52) U.S. Cl.
CPC ....... *H04L 25/0242* (2013.01); *H04B 7/0413* (2013.01); *H04L 5/0007* (2013.01); *H04L 5/0048* (2013.01); *H04L 25/0204* (2013.01)

(58) Field of Classification Search
CPC . H04L 5/0048; H04L 5/0023; H04L 25/0242; H04L 5/0007; H04L 25/0204; H04B 7/0413
See application file for complete search history.

(56) References Cited

U.S. PATENT DOCUMENTS

2018/0351708 A1\* 12/2018 Wang ................... H04B 7/0452
2020/0358484 A1\* 11/2020 Lee ....................... H04B 7/0417

\* cited by examiner

*Primary Examiner* — Sung S Ahn
(74) *Attorney, Agent, or Firm* — JCIPRNET

(57) ABSTRACT

A time-frequency block-sparse channel estimation method based on compressed sensing includes the following steps. Step 1: A channel model is established. Step 2: According to the channel model obtained in Step 1, a sparse signal estimation value is solved by a compressed sensing method to further calculate an index set. Step 3: According to the index set obtained in Step 2, a channel matrix estimation value is solved. The method provides a generalized block adaptive gBAMP algorithm, which uses time-frequency joint block sparsity of a massive MIMO system to further optimize selection of an index set in an algorithm iteration process to improve stability of the algorithm. Then, without a specified threshold parameter, based on an F norm, an adaptive iteration stop condition is determined based on a residual, and the validity of the method is proved.

3 Claims, 1 Drawing Sheet

TIME-FREQUENCY BLOCK-SPARSE CHANNEL ESTIMATION METHOD BASED ON COMPRESSED SENSING

CROSS-REFERENCE TO RELATED APPLICATION

This application claims the priority benefit of China application serial no. 202010454893.2, filed on May 26, 2020. The entirety of the above-mentioned patent application is hereby incorporated by reference herein and made a part of this specification.

BACKGROUND

Technical Field

The disclosure relates to the field of pilot-assisted channel estimation in a wireless communication system, and in particular, to a time-frequency block-sparse channel estimation method based on compressed sensing.

Description of Related Art

Massive multiple-input and multiple-output (MIMO) is a key technology in next-generation 5G mobile cellular network communications and can improve the system capacity and spectrum utilization. However, in a massive MIMO system, as the antenna quantity at the base station end and the number of users in a cell increase, the acquisition and accuracy of channel state information become key issues. Compared with the time-division duplexing (TDD) system, the frequency-division duplexing (FDD) system can provide more efficient communication with low delay and dominates the current wireless communication. Therefore, it is necessary to study more effective channel estimation of the FDD system.

In a massive MIMO system, a channel has block sparsity of its time domain, frequency domain, and spatial domain. With respect to this sparsity structure, in recent years, many scholars have applied the compressed sensing theory to pilot-assisted channel estimation to achieve better performance. However, these algorithms all require a specified threshold condition to ensure the algorithm reconstruction precision, and for different occasions, the threshold is different. Therefore, how to determine the size of the threshold becomes a difficult issue.

SUMMARY

The disclosure addresses the issue of channel estimation of an FDD downlink massive MIMO system which remains unsolved in the related art, and provides a time-frequency block-sparse channel estimation method based on compressed sensing which can quickly and accurately recover massive MIMO channel information of which the sparsity degree is unknown.

The technical solutions adopted to solve the technical problems herein are as follows.

The disclosure provides a time-frequency block-sparse channel estimation method based on compressed sensing, where an orthogonal frequency-division multiplexing (OFDM) system of a downlink frequency-division duplexing (FDD) massive MIMO channel model is initialized, supposing M antennas are disposed at a base station end and U single-antenna users are simultaneously served, and let there be N subcarriers in the OFDM system, where $N_P$ subcarriers are used to transmit pilot signals, and L is a maximum path delay, considering observing in R adjacent OFDM symbols.

Based on a time-frequency block sparsity and a compressed sensing framework of a massive MIMO channel, the method includes the following steps.

Step 1: A pilot signal and a reception signal of a transmitting end are inputted, and a channel model is established as $Y=\Psi H+V$ according to the signal, where $Y \in \mathbb{C}^{N_P \times R}$ is a reception signal matrix, $H \in \mathbb{C}^{LM \times R}$ is a channel matrix, $\Psi \in \mathbb{C}^{N_P \times R}$ is a pilot matrix, $V \in \mathbb{C}^{N_P \times R}$ is a noise matrix.

Step 2: A sparse signal estimation value $\tilde{H}$ is solved by a compressed sensing method according to the channel model obtained in Step 1 to further calculate an index set $\tilde{\Gamma}_k$.

Step 3: A channel matrix estimation value $\tilde{H}_{\tilde{\Gamma}_k}$ is solved according to the index set $\tilde{\Gamma}_k$ obtained in Step 2, i.e., $\tilde{H}_{\tilde{\Gamma}_k} = \Psi_{\tilde{\Gamma}_k}^\dagger Y$, where a superscript "$\dagger$" represents a pseudoinverse, i.e., $\Psi_{\tilde{\Gamma}_k}^\dagger$ represents a pseudoinverse with respect to $\Psi_{\tilde{\Gamma}_k}$, and after a baseband signal is demodulated, data information of the transmitting end is outputted according to the obtained channel matrix estimation value $\tilde{H}_{\tilde{\Gamma}_k}$.

Further, Step 1 of the disclosure further includes the following.

After the channel model is established, since $N_P \ll LM$, it is determined that the channel model is an underdetermined equation, and since a joint sparsity structure is present in the massive MIMO channel, it is determined to reconstruct a high-dimensional channel H from a low-dimensional vector Y by a channel estimation method based on compressed sensing.

Further, the compressed sensing method in Step 2 specifically includes the following.

Parameters are inputted as a measurement value Y, a sensing matrix $\Psi$, a step size S, and a maximum path delay L; a residual vector $v_0=Y$ is initialized, a signal estimation value $H=0 \in \mathbb{C}^{LM \times T}$ is reconstructed, an index set $\Gamma=\emptyset$, let an initial iteration count k=1, and a step size count I=1 is updated. The method includes the following steps.

Step 201: A projection coefficient of each column of the sensing matrix on the residual vector is calculated, i.e., $Z=\Psi^H v_{k-1}$.

Step 202: A matrix $Z \in \mathbb{C}^{LM \times R}$ is converted into a matrix $\hat{Z}$ of L×RM by joint sparsity of the channel, and $\hat{Z}$ is summed by row to obtain $$\tilde{Z} = \sum_i^{RM} \|\hat{Z}\|_F^2 \in \mathbb{C}^{L \times 1}.$$

Step 203: The index set updated: $\Gamma_k^L = \Gamma_{k-1}^L \cup \{\arg\max(\tilde{Z}, S)\}$.

Step 204: The index set $\Gamma_k^L$ is extended to $\Gamma_k^{Li} = \Gamma_k^L + iL$, $1 \leq i \leq M$, and the index sets are merged, $\Gamma_k = \Gamma_k^L \cup \Gamma_k^{L2} \cdots \cup \Gamma_k^{LM}$.

Step 205: The estimation value of the channel H is solved by a least squares method: $\hat{H}_{\Gamma_k}^k = \Psi_{\Gamma_k}^\dagger Y$.

Step 206: A matrix $\tilde{H}_{\Gamma_k}^k \in \mathbb{C}^{LM \times R}$ is converted into a matrix $\hat{H}_{\Gamma_k}^k$ of L×RM, and $\hat{H}_{\Gamma_k}^k$ is summed by row to obtain $$H_{\Gamma_k}^k = \sum_i^{RM} \tilde{H}_{\Gamma_k}^k \in \mathbb{C}^{L \times 1}.$$

Step 207: An index set is obtained: $\Gamma_k^L = \arg\max(\bar{H}_{\Gamma_k}^k, S)$.

Step 208: The index set $\Gamma k$ is extended to $\Gamma_k^{Li} = \Gamma_k^L + iL$, $1 \leq i \leq M$, and the index sets are merged, $\Gamma_k = \Gamma_k^L \cup \Gamma_k^{L2} \ldots \cup \Gamma_k^{LM}$.

Step 209: The estimation value of the channel H is solved by a least squares method: $\widetilde{\mathbf{H}}_{\Gamma_k}^k = \mathbf{\Psi}_{\Gamma_k}^{\dagger} Y$.

Step 210: The residual is updated: $v'_k = Y - \Psi \widetilde{\mathbf{H}}_{\Gamma_k}^k$.

Step 211: If $\|v_k'\|_F > \|v_{k-1}\|_F$, then $\hat{\Gamma}_k = \bar{\Gamma}_k$ and operation is stopped.

Step 212: If $\|v_k'\|_F = \|v_{k-1}\|_F$, then $I=I+1$, $S=S\times I$, $\hat{\Gamma}_k = \Gamma_k$.

Step 213: If $\|v_k'\|_F < \|v_{k-1}\|_F$, then $v_k = v_k'$, $\Gamma_k^L = \Gamma_k^L$.

Step 214: $k=k+1$, Step 201 to Step 214 are repeated until the stop condition is satisfied.

In the time-frequency block-sparse channel estimation method based on compressed sensing of the disclosure, with respect to an FDD downlink massive MIMO system, the iteration stop condition is adaptively determined based on the residual by using channel time-frequency block sparsity while there is no threshold parameter and the sparsity degree is unknown, which achieves more accurate channel estimation performance than conventional matching pursuit algorithms. Simulation shows that the algorithm can quickly and accurately recover massive MIMO channel information of which the sparsity degree is unknown.

BRIEF DESCRIPTION OF THE DRAWINGS

The disclosure will be further described below with reference to the accompanying drawings and embodiments.

DESCRIPTION OF THE EMBODIMENTS

Figure 1:
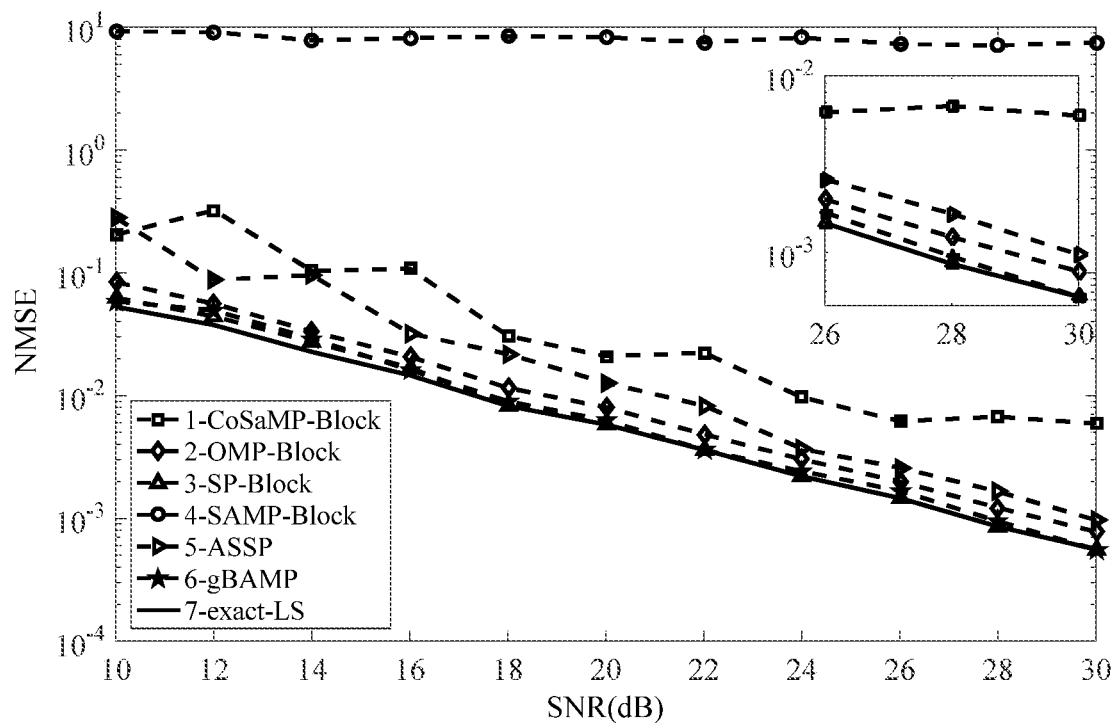
FIG. 1 is a diagram showing normalized mean square errors (NMSE) at different signal-to-noise ratios (SNR) of an embodiment of the disclosure and comparative embodiments.

To make the objectives, technical solutions, and advantages of the disclosure more apparent, the disclosure will be described in further detail below with reference to the accompanying drawings and embodiments. It should be understood that the specific embodiments described herein are merely illustrative of the disclosure and are not intended to limit the disclosure.

In an embodiment of the disclosure, an FDD downlink massive MIMO system is considered, in which an antenna quantity of a base station is M=20, and U=6 single-antenna users are simultaneously served. A total number of subcarriers of OFDM symbols is N=4096, where $N_P$=100 subcarriers are used to transmit pilot signals. Pilots are placed all in the same manner; namely, they are distributed randomly and the pilots among different antennas are orthogonal to each other. A channel length L is 160, and a TU-6 channel model is adopted, where a number of paths S=6, path delays are respectively 0.0, 0.2, 0.5, 1.6, 2.3, 5, and path gains are respectively −3, 0, −2, −6, −8, −10. Let a coherence time T of the channel be T=4 OFDM symbols. Based on a time-frequency block sparsity and a compressed sensing framework of a massive MIMO channel, the channel estimation method includes the following steps.

Step 1: A pilot signal and a reception signal of a transmitting end are inputted, and a channel model is established as $Y = \Psi H + V$ according to the signal.

where $Y \in \mathbb{C}^{N_P \times R}$ is a reception signal matrix, $H \in \mathbb{C}^{LM \times R}$ is a channel matrix, $\Psi \in \mathbb{C}^{N_P \times LM}$ is a pilot matrix, $V \in \mathbb{C}^{N_P \times R}$ is a noise matrix; since $N_P \ll LM$, the channel model is an underdetermined equation, but a joint sparsity structure is present in the massive MIMO channel, and a high-dimensional channel H may be reconstructed from a low-dimensional vector Y by a channel estimation method based on compressed sensing.

Step 2: A sparse signal estimation value $\tilde{H}$ is solved by a compressed sensing method according to the channel model obtained in Step 1 to further calculate an index set $\tilde{\Gamma}_k$.

The compressed sensing method in Step 2 specifically includes the following.

Parameters are inputted as a measurement value Y, a sensing matrix $\Psi$, a step size S, and a maximum path delay L; a residual vector $v_0 = Y$ is initialized, a signal estimation value $H = 0 \in \mathbb{C}^{LM \times T}$ is reconstructed, an index set $\Gamma = \emptyset$, letting an initial iteration count k=1, and a step size count I=1 is updated; the method includes the following steps.

Step 201: A projection coefficient of each column of the sensing matrix on the residual vector is calculated, i.e., $Z = \Psi^H v_{k-1}$.

Step 202: A matrix $Z \in \mathbb{C}^{LM \times R}$ is converted into a matrix $\hat{Z}$ of $L \times RM$ by joint sparsity of the channel, and $\hat{Z}$ is summed by row to obtain $$\tilde{Z} = \sum_i^{RM} \|\hat{z}_i\|_F^2 \in \mathbb{C}^{L \times 1}.$$

Step 203: The index set is updated: $\Gamma_k^L = \Gamma_{k-1}^L \cup \{\arg\max(\tilde{Z}, S)\}$.

Step 204: The index set $\Gamma_k^L$ is extended to $\Gamma_k^{Li} = \Gamma_k^L + iL$, $1 \leq i \leq M$, and the index sets are merged, $\Gamma_k = \Gamma_k^L \cup \Gamma_k^{L2} \ldots \cup \Gamma_k^{LM}$.

Step 205: The estimation value of the channel H is solved by a least squares method: $\hat{H}_{\Gamma_k}^k = \Psi_{\Gamma_k}^{\dagger} Y$.

Step 206: A matrix $\hat{H}_{\Gamma_k}^k \in \mathbb{C}^{LM \times R}$ is converted into a matrix $\tilde{H}_{\Gamma_k}^k$ of $L \times RM$, and $\tilde{H}_{\Gamma_k}^k$ is summed by row to obtain $$\bar{H}_{\Gamma_k}^k = \sum_i^{RM} \tilde{H}_{\Gamma_k}^k \in \mathbb{C}^{L \times 1}.$$

Step 207: An index set is obtained: $\Gamma_k^L = \arg\max(\bar{H}_{\Gamma_k}^k, S)$.

Step 208: The index set $\Gamma_k^L$ is extended to $\Gamma_k^{Li} = \Gamma_k^L + iL$, $1 \leq i \leq M$, and the index sets are merged, $\Gamma_k = \Gamma_k^L \cup \Gamma_k^{L2} \ldots \cup \Gamma_k^{LM}$.

Step 209: The estimation value of the channel H is solved by a least squares method: $\widetilde{\mathbf{H}}_{\Gamma_k}^k = \mathbf{\Psi}_{\Gamma_k}^{\dagger} Y$.

Step 210: The residual is updated: $v_k' = Y - \Psi \widetilde{\mathbf{H}}_{\Gamma_k}^k$.

Step 211: If $\|v_k'\|_F > \|v_{k-1}\|_F$, then $\hat{\Gamma}_k = \bar{\Gamma}_k$ and operation is stopped.

Step 212: If $\|v_k'\|_F = \|v_{k-1}\|_F$, then $I=I+1$, $S=S\times I$, $\hat{\Gamma}_k = \Gamma_k$.

Step 213: If $\|v_k'\|_F < \|v_{k-1}\|_F$, then $v_k = v_k'$, $\Gamma_k^L = \Gamma_k^L$.

Step 214: $k=k+1$; Step 201 to Step 214 are repeated until the stop condition is satisfied.

Step 3: According to the index set $\tilde{\Gamma}_k$ obtained in Step 2, a channel matrix estimation value $\tilde{H}_{\tilde{\Gamma}_k}$ may be solved, i.e., $\tilde{H}_{\tilde{\Gamma}_k} = \Psi^\dagger_{\tilde{\Gamma}_k} Y$, where a superscript "†" represents a pseudo-inverse, i.e., $\Psi^\dagger_{\tilde{\Gamma}_k}$ represents a pseudoinverse with respect to $\Psi_{\tilde{\Gamma}_k}$, and according to the obtained channel matrix estimation value $\tilde{H}_{\tilde{\Gamma}_k}$, after a baseband signal is demodulated, data information of the transmitting end is outputted.

To evaluate the performance of the disclosure, when the antenna quantity M is 16, the step size s is 2, and a threshold parameter µ of the algorithm reconstruction precision is all 0.001, normalized least mean square errors of channel estimation algorithms at different signal-to-noise ratios are calculated, and the result is shown in FIG. 1.

Figure 2:
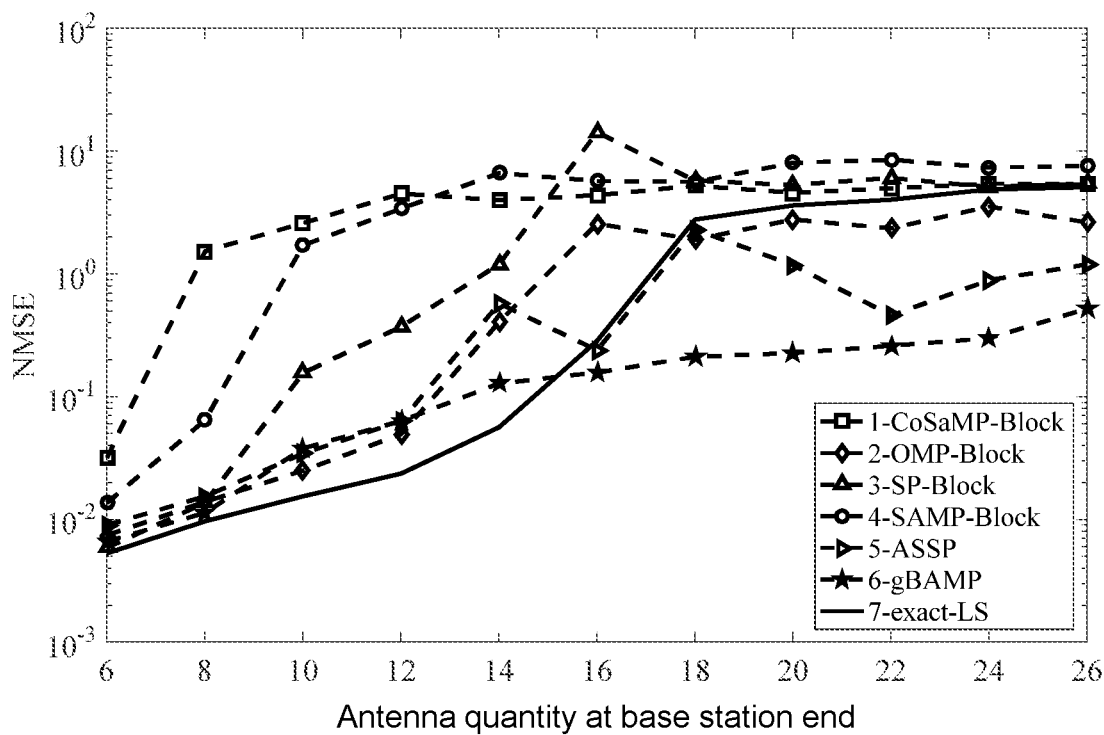
FIG. 2 is a diagram showing normalized mean square errors at different transmitting antenna quantities of the embodiment of the disclosure and the comparative embodiments.

To further evaluate the performance of the disclosure, when the signal-to-noise ratio is 20 dB, the step size s is 2, the threshold parameter µ of the algorithm reconstruction precision is all 0.001, normalized least mean square errors of channel estimation algorithms at different transmitting antennas of the base station are calculated, and the result is shown in FIG. 2.

The normalized least mean square error is defined as follows:

$$NMSE = \frac{\sum_{j=1}^{N_e} \sqrt{\sum_{i=1}^{LMT} (\tilde{H} - H)^2}}{N_e MT}$$

where $N_e$ represents an operation count of the algorithm at each signal-to-noise ratio, and herein, $N_e$ is 20.

According to FIG. 1, in the embodiment of the disclosure, with the generalized adaptive mechanism introduced, the proposed gBAMP algorithm can detect the minimum precision achieved by the reconstruction and automatically end the reconstruction process without the constraint of the threshold parameter µ. The experimental result shows that the algorithm achieves good performance close to that of the exact-LS algorithm and is superior to other algorithms.

According to FIG. 2, as the antenna quantity increases, the precision of channel reconstruction is affected, and the reason lies in that the increase in the antenna quantity leads to pilot insufficiency. The reconstruction by the SAMP-Block algorithm fails at the threshold parameter. However, in the embodiment of the disclosure, when the antenna quantity is 16 more, the proposed gBAMP algorithm exhibits better performance, and exhibits optimal performance in both precision and stability that are even better than those of the exact-LS algorithm.

The time-frequency block-sparse channel estimation method based on compressed sensing in the embodiment of the disclosure, i.e., a generalized block adaptive gBAMP algorithm, has good reconstruction performance and is applicable to occasions requiring pilot-assisted channel estimation of a wireless communication system.

Simulation shows that the method of the disclosure can quickly and accurately recover massive MIMO channel information of which a sparsity degree is unknown.

It will be understood that modifications and variations may be made by persons skilled in the art according to the above description, and all such modifications and variations are intended to be included within the scope of the disclosure as defined in the appended claims.

What is claimed is:

1. A time-frequency block-sparse channel estimation method based on compressed sensing, wherein an orthogonal frequency-division multiplexing (OFDM) system of a downlink frequency-division duplexing (FDD) massive MIMO channel model is initialized, supposing M antennas are disposed at a base station end and U single-antenna users are simultaneously served, and let there be N subcarriers in the OFDM system, wherein $N_P$ subcarriers are used to transmit pilot signals, and L is a maximum path delay, considering observing in R adjacent OFDM symbols, the method comprising:

Step 1: inputting a pilot signal and a reception signal of a transmitting end, and establishing a channel model as Y=ΨH+V according to the signal,
wherein $Y \in \mathbb{C}^{N_P \times R}$ is a reception signal matrix, $H \in \mathbb{C}^{LM \times R}$ is a channel matrix, $\Psi \in \mathbb{C}^{N_P \times LM}$ is a pilot matrix, $V \in \mathbb{C}^{N_P \times R}$ is a noise matrix;

Step 2: solving a sparse signal estimation value $\tilde{H}$ by a compressed sensing method according to the channel model obtained in Step 1 to further calculate an index set $\tilde{\Gamma}_k$; and Step 3: solving a channel matrix estimation value $\tilde{H}_{\tilde{\Gamma}_k}$ according to the index set $\tilde{\Gamma}_k$ obtained in Step 2, i.e., $\tilde{H}_{\tilde{\Gamma}_k} = \Psi^\dagger_{\tilde{\Gamma}_k} Y$, wherein a superscript "†" represents a pseudoinverse, i.e., $\Psi^\dagger_{\tilde{\Gamma}_k}$ represents a pseudoinverse with respect to $\Psi_{\tilde{\Gamma}_k}$, and after a baseband signal is demodulated, outputting data information of the transmitting end according to the obtained channel matrix estimation value $\tilde{H}_{\tilde{\Gamma}_k}$.

2. The time-frequency block-sparse channel estimation method based on compressed sensing according to claim 1, wherein Step 1 further comprises:
after establishing the channel model, since $N_P \ll LM$, determining that the channel model is an underdetermined equation, and since a joint sparsity structure is present in the massive MIMO channel, determining to reconstruct a high-dimensional channel H from a low-dimensional vector Y by a channel estimation method based on compressed sensing.

3. The time-frequency block-sparse channel estimation method based on compressed sensing according to claim 1, wherein the compressed sensing method in Step 2 specifically comprises:
inputting parameters as a measurement value Y, a sensing matrix Ψ, a step size S, and a maximum path delay L; initializing a residual vector $v_0 = Y$, reconstructing a signal estimation value $H = 0 \in \mathbb{C}^{LM \times T}$ an index set $\Gamma = \emptyset$, letting an initial iteration count k=1, and updating a step size count I=1, the method comprising:

Step 201: calculating a projection coefficient of each column of the sensing matrix on the residual vector, i.e., $Z = \Psi^H v_{k-1}$;

Step 202: converting a matrix $Z \in \mathbb{C}^{LM \times R}$ into a matrix $\hat{Z}$ of L×RM by joint sparsity of the channel, and summing $\hat{Z}$ by row to obtain $$\bar{Z} = \sum_i^{RM} \|\hat{z}\|_F^2 \in \mathbb{C}^{L \times 1};$$

Step 203: updating the index set: $\Gamma_k^L = \Gamma_{k-1}^L \cup \{\arg \max (\tilde{Z}, S)\}$;

Step 204: extending the index set $\Gamma_k^L$ to $\Gamma_k^{Li} = \Gamma_k^L + iL$, 1≤i≤M, and merging the index sets, $\Gamma_k = \Gamma_k^L \cup \Gamma_k^{L2} \ldots \cup \Gamma_k^{LM}$;

Step 205: solving the estimation value of the channel H by a least squares method: $\hat{H}_{\Gamma_k}^k = \Psi_{\Gamma_k}^\dagger Y$;

Step 206: converting a matrix $\hat{H}_{\Gamma_k}^k \in \mathbb{C}^{LM \times R}$ into a matrix $\breve{H}_{\Gamma_k}^k$ of L×RM, and summing $\breve{H}_{\Gamma_k}^k$ by row to obtain $$H_{\Gamma_k}^k = \sum_i^{RM} \breve{H}_{\Gamma_k}^k \in \mathbb{C}^{L \times 1};$$

Step 207: obtaining an index set: $\Gamma_k^L = \arg\max(\overline{H}_{\Gamma_k}^k, S)$;

Step 208: extending the index set $\Gamma_k^L$ to $\Gamma_k^{Li} = \Gamma_k^L + iL$, $1 \leq i \leq M$, and merging the index sets, $\Gamma_k = \Gamma_k^L \cup \Gamma_k^{L2} \ldots \cup \Gamma_k^{LM}$;

Step 209: solving the estimation value of the channel H by a least squares method: $\widetilde{H}_{\Gamma_k}^k = \Psi_{\Gamma_k}^\dagger Y$;

Step 210: updating the residual: $v_k' = Y - \Psi \widetilde{H}_{\Gamma_k}^k$;

Step 211: if $\|v_k'\|_F > \|v_{k-1}\|_F$, then $\tilde{\Gamma}_k = \hat{\Gamma}_k$ and stopping operation;

Step 212: If $\|v_k'\|_F = \|v_{k-1}\|_F$, then I=I+1, S=S×I, $\hat{\Gamma}_k = \Gamma_k$;

Step 213: If $\|v_k'\|_F < \|v_{k-1}\|_F$, then $v_k = v_k'$, $\Gamma_k^L = \overline{\Gamma}_k^L$; and Step 214: k=k+1, Step 201 to Step 214 are repeated until the stop condition is satisfied.

* * * * *